(12) United States Patent
Wang et al.

(10) Patent No.: US 10,138,434 B2
(45) Date of Patent: Nov. 27, 2018

(54) SURFACE TREATMENT METHOD AND DEVICE TREATED THEREBY

(71) Applicant: GENERAL ELECTRIC COMPANY, Schenectady, NY (US)

(72) Inventors: Shizhong Wang, Shanghai (CN); Wenqing Peng, Shanghai (CN); Lawrence Bernard Kool, Clifton Park, NY (US); Nan Hao, Shanghai (CN); Wusheng Xu, Shanghai (CN); Minghu Guo, Shanghai (CN); Hong Zhou, Shanghai (CN); Yanfei Gu, Shanghai (CN); Zhaohui Yang, Shanghai (CN)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 15/102,917

(22) PCT Filed: Nov. 6, 2014

(86) PCT No.: PCT/US2014/064236
§ 371 (c)(1),
(2) Date: Jun. 9, 2016

(87) PCT Pub. No.: WO2015/088679
PCT Pub. Date: Jun. 18, 2015

(65) Prior Publication Data
US 2016/0304796 A1 Oct. 20, 2016

(30) Foreign Application Priority Data

Dec. 13, 2013 (CN) .......................... 2013 1 0686904

(51) Int. Cl.
| | | |
|---|---|---|
| *C23C 12/00* | (2006.01) | |
| *C10G 75/04* | (2006.01) | |

(Continued)

(52) U.S. Cl.
CPC ............... *C10G 75/04* (2013.01); *C10G 7/10* (2013.01); *C10G 9/16* (2013.01); *C10G 75/00* (2013.01); *C23C 24/082* (2013.01); *F16L 58/14* (2013.01)

(58) Field of Classification Search
CPC .......... C23C 8/60; C23C 10/28; C23C 12/00; C23C 12/02; C23C 24/082; C10G 75/04
See application file for complete search history.

(56) References Cited

U.S. PATENT DOCUMENTS

| | | |
|---|---|---|
| 4,150,063 A | 4/1979 | Besozzi et al. |
| 4,500,364 A | 2/1985 | Krutenat |

(Continued)

FOREIGN PATENT DOCUMENTS

| | | |
|---|---|---|
| CN | 102295284 A | 12/2011 |
| EP | 2 393 148 A1 | 12/2011 |

(Continued)

OTHER PUBLICATIONS

First Office Action and Search issued in connection with corresponding CN Application No. 201310686904.X dated Oct. 21, 2016.

(Continued)

*Primary Examiner* — Nathan H Empie
(74) *Attorney, Agent, or Firm* — Wegman, Hessler & Vanderburg

(57) ABSTRACT

A surface treatment method includes: contacting a substrate with a treatment material, the substrate comprising a metallic element, the treatment material comprising an alkaline earth metal element, an alkali metal element, or any combination thereof; and forming on the substrate a surface layer comprising a first oxide of the alkaline earth metal element, the alkali metal element, or any combination thereof and a second oxide of the metallic element. A device has: a (Continued)

substrate layer comprising a metallic element; and a surface layer comprising a first oxide of an alkaline earth metal element, an alkali metal element, or any combination thereof, and a second oxide of the metallic element.

6 Claims, 1 Drawing Sheet

(51) Int. Cl.

| | | |
|---|---|---|
| *C10G 75/00* | (2006.01) | |
| *C10G 7/10* | (2006.01) | |
| *C10G 9/16* | (2006.01) | |
| *C23C 24/08* | (2006.01) | |
| *F16L 58/14* | (2006.01) | |

(56) References Cited

U.S. PATENT DOCUMENTS

| | | | |
|---|---|---|---|
| 5,358,913 A * | 10/1994 | Chatterjee | C04B 35/486 |
| | | | 428/34.6 |
| 5,873,951 A | 2/1999 | Wynns et al. | |
| 6,071,563 A | 6/2000 | Kozlowski et al. | |
| 6,074,713 A | 6/2000 | Trotter | |
| 6,228,253 B1 | 5/2001 | Gandman | |
| 6,503,340 B1 | 1/2003 | Gold et al. | |
| 6,548,030 B2 | 4/2003 | Heyse et al. | |
| 6,852,361 B2 | 2/2005 | Kang et al. | |
| 2003/0152701 A1 | 8/2003 | Kang et al. | |
| 2004/0188323 A1 | 9/2004 | Tzatzov et al. | |
| 2009/0026187 A1 | 1/2009 | Hobson et al. | |
| 2009/0029187 A1 | 1/2009 | Schuisky et al. | |
| 2010/0112378 A1 | 5/2010 | Deininger et al. | |
| 2011/0295051 A1 | 12/2011 | Wang et al. | |
| 2013/0184510 A1 | 7/2013 | Huang | |
| 2013/0267750 A1 * | 10/2013 | Gu | C10G 9/16 |
| | | | 585/636 |

FOREIGN PATENT DOCUMENTS

| | | |
|---|---|---|
| EP | 2655564 A1 | 10/2013 |
| JP | H 06146011 A | 5/1994 |
| JP | 2003520895 A | 7/2003 |
| JP | 2004507424 A | 3/2004 |
| JP | 2008522037 A | 6/2008 |
| WO | WO 02/18128 A1 | 3/2002 |
| WO | WO 2010/087298 A1 | 8/2010 |
| WO | 2012087550 A1 | 6/2012 |

OTHER PUBLICATIONS

Office Action issued in connection with corresponding EP Application No. 14802760.0 dated Jun. 6, 2017.
Communication Pursuant to Article 94(3) EPC dated Jun. 6, 2017 in European Patent Application No. 14 802 760.0.
English Translation of First Official Action dated Nov. 28, 2017 in Japanese Patent Application No. 2016-53750.
C.L.Tsai, et al., "Low temperature sintering of Ba(Zr0.8—xCexY0.2)O3-δ using lithium fluoride additive", Solid State Ionics, Date— Aug. 4, 2010, pp. 1083-1090, vol. 181, Issues 23-24.
International Search Report and Written Opinion dated Feb. 4, 2015 which was issued in connection with PCT/US2014/064236 which was filed on Nov. 6, 2014.

* cited by examiner

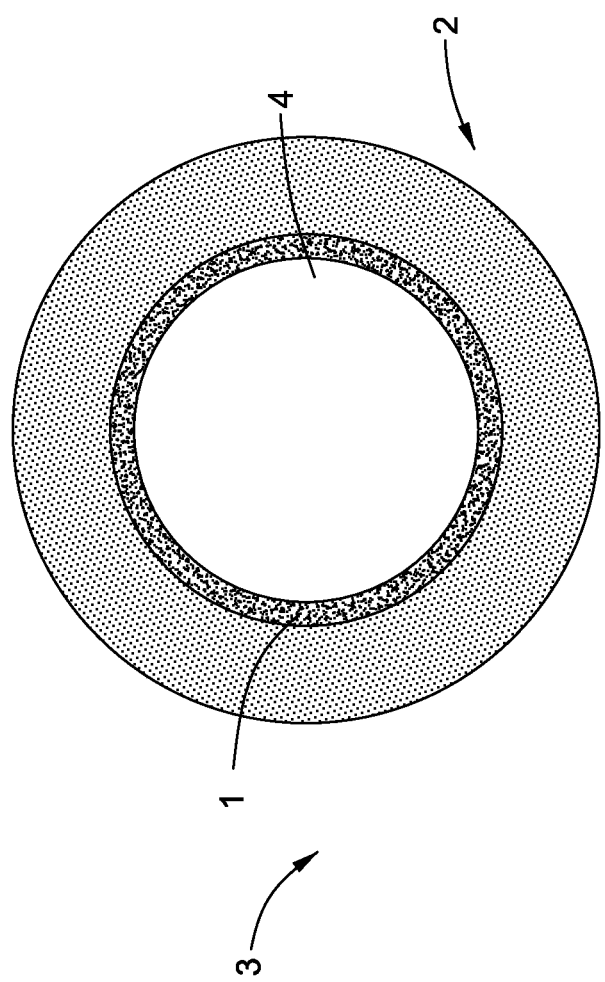

SURFACE TREATMENT METHOD AND DEVICE TREATED THEREBY

BACKGROUND

Embodiments of the present invention relate generally to surface treatment methods and devices treated thereby, useful especially in byproduct carbonaceous material formation environments.

Carbonaceous materials, such as coke and soot, are byproducts of many processes and are usually undesirable. For example, during hydrocarbon cracking processes, the build-up of carbonaceous materials (i.e. the byproduct coke) happens on inner surfaces of apparatus components, for instance, inner radiant tube surfaces of furnace equipment. When the inner radiant tube surfaces become gradually coated with a layer of coke, the radiant tube metal temperature (TMT) rises and the pressure drop through radiant coils increases. In addition, the coke build-up adversely affects the physical characteristics of the apparatus components, e.g., the radiant tubes, by deteriorating mechanical properties such as stress rupture, thermal fatigue, and ductility due to carburization.

Other byproduct carbonaceous material formation apparatuses and methods, e.g., apparatuses and methods for the steam reforming of methane and for carbonaceous fuel combustion, also have problems caused by the build-up of carbonaceous material.

A variety of methods have been considered in order to overcome the disadvantages of carbonaceous material build-up on apparatus components, such as furnace tube inner surfaces. These methods include: metallurgy upgrade to alloys with increased chromium content of the metal substrates used in the apparatuses; and adding additives such as sulfur, dimethyl sulfide (DMS), and dimethyl disulfide (DMDS) or hydrogen sulfide to the feedstock to the apparatuses.

While some of the aforementioned methods have general use in various industries, it is desirable to provide new approaches to reduce or eliminate the build-up of carbonaceous material.

BRIEF DESCRIPTION

In one aspect, the invention relates to a surface treatment method, comprising: contacting a substrate with a treatment material, the substrate comprising a metallic element, the treatment material comprising an alkaline earth metal element, an alkali metal element, or any combination thereof; and forming on the substrate a surface layer comprising a first oxide of the alkaline earth metal element or the alkali metal element and a second oxide of the metallic element.

In another aspect, the invention relates to a device comprising: a substrate layer comprising a metallic element; and a surface layer comprising a first oxide of an alkaline earth metal element, an alkali metal element, or any combination thereof and a second oxide of the metallic element.

BRIEF DESCRIPTION OF THE DRAWINGS

These and other features, aspects, and advantages of the present invention will become better understood when the following detailed description is read with reference to the accompanying drawings, wherein:

FIG. 1 illustrates a schematic cross sectional view of a tube of a device according to some embodiments of the invention.

DETAILED DESCRIPTION

Unless defined otherwise, technical and scientific terms used herein have the same meaning as is commonly understood by one of ordinary skill in the art to which this disclosure belongs. The use of "including", "comprising" or "having" and variations thereof herein are meant to encompass the items listed thereafter and equivalents thereof as well as additional items.

Approximating language, as used herein throughout the specification and claims, may be applied to modify any quantitative representation that could permissibly vary without resulting in a change in the basic function to which it is related. Accordingly, a value modified by a term or terms, such as "about" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the specification and the claims, the singular forms "a", "an" and "the" include plural referents unless the context clearly dictates otherwise. Moreover, the suffix "(s)" as used herein is usually intended to include both the singular and the plural of the term that it modifies, thereby including one or more of that term.

As used herein, the term "or" is not meant to be exclusive and refers to at least one of the referenced components (for example, a material) being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

Embodiments of the present invention relate to surface treatment methods and devices treated thereby to avoid or reduce the build-up of carbonaceous material in byproduct carbonaceous material formation environments.

As used herein the term "carbonaceous material" refers to but is not limited to carbonaceous solid or liquid, or particulates or macromolecules forming the carbonaceous solid or liquid, which are derived from coal, petroleum, wood, hydrocarbons and other materials containing carbon and which include, for example, carbon black, tar, soot, and coke. In some embodiments, the carbonaceous material is coke or soot.

As used herein, the term "byproduct carbonaceous material formation environment" refers to any environments that may yield carbonaceous material as an undesirable byproduct. In some embodiments, the byproduct carbonaceous material formation environment is a petrochemical processing environment. In some embodiments, the byproduct carbonaceous material formation environment is hydrocarbon cracking environment in which coke may be formed and the build-up of coke on the device needs to be avoided or reduced.

In some embodiments, the byproduct carbonaceous material formation environment is a hydrocarbon cracking environment at a temperature in a range from about 700° C. to about 870° C., a weight ratio of steam to hydrocarbon is in a range from about 3:7 to about 7:3, and the hydrocarbon comprises at least one of ethane, heptane, liquid petroleum gas, naphtha, and gas oil.

In some embodiments, the byproduct carbonaceous material formation environment is a hydrocarbon cracking environment at a temperature in a range from about 480° C. to about 600° C., and the hydrocarbon comprises bottoms from atmospheric and vacuum distillation of crude oil and a weight percentage of steam is in a range from about 1 wt % to about 2 wt %.

As used herein the term "hydrocarbon cracking", "cracking hydrocarbon", or any variation thereof, refers to but is not limited to processes in which hydrocarbons such as ethane, propane, butane, naphtha, and bottoms from atmospheric and vacuum distillation of crude oil are cracked in devices to obtain materials with smaller molecules.

As used herein, the term "device" refers to but is not limited to any device that may be exposed to a byproduct carbonaceous material formation environment. In some embodiments, the device includes at least one of a furnace tube, a tube fitting, a reaction vessel, and a radiant tube. The device may be a pyrolysis furnace comprising a firebox through which runs an array of tubing. The array of tubing and corresponding fittings may be several hundred meters in length. The array of tubing may comprise straight or serpentine tubes.

The substrate may be any component of the device. In some embodiments, as is shown in FIG. 1, the substrate 1 is a tube 2 of a device 3, and the byproduct carbonaceous material formation environment 4 is inside the tube 2.

The metallic element may be any metallic element that is used in the device. In some embodiments, the metallic element is chromium (Cr), ferrum (Fe), nickel (Ni), titanium (Ti), manganese (Mn), or any combination thereof.

In some embodiments, the substrate comprises an alloy of the metallic element. Examples of alloys include, but are not limited to, high temperature alloys listed in table 1 below, in each of which iron is the balance of the composition.

TABLE 1

| Element, wt % | Kubota KHR45A | Manaurite XTM | HK40 alloy | HP40 alloy | Incoloy ® 800H |
|---|---|---|---|---|---|
| C | 0.4-0.6 | 0.4-0.5 | 0.35-0.45 | 0.37-0.45 | <=0.1 |
| Mn | <2 | <1.5 | <1.5 | <=1.25 | <=1.5 |
| Si | <2 | 1-2 | 0.5-2.0 | <2 | <=1 |
| S | <=0.03 | <=0.03 | <0.04 | <=0.03 | |
| P | <=0.03 | <=0.03 | <0.04 | <=0.03 | |
| Cr | 34-37 | 34-37 | 23-27 | 24-27 | 19-23 |
| Ni | 40-47 | 13-48 | 19-22 | 34-37 | 30-35 |
| Nb | 0.8-1.5 | 0.5-1 | | | |
| Ti | <=0.15 | | | | 0.15-0.6 |
| Mo | | | <=0.5 | <=0.5 | |

The treatment material may be any material comprising the alkaline earth metal element or the alkali metal element. In some embodiments, the treatment material includes a perovskite material, barium carbonate, or ceria.

As used herein the term "alkaline earth metal element" or any variation thereof refers to an element in a group of elements in the periodic table, including beryllium (Be), magnesium (Mg), calcium (Ca), strontium (Sr), barium (Ba), and radium (Ra).

As used herein the term "alkali metal element" or any variation thereof refers to an element in the group in the periodic table consisting of the chemical elements lithium (Li), sodium (Na), potassium (K), rubidium (Rb), cesium (Cs), and francium (Fr).

As used herein the term "perovskite material" or any variation thereof refers to but is not limited to any material having an $ABO_3$ perovskite structure and being of formula $A_aB_bO_{3-\delta}$. In some embodiments, in the $ABO_3$ perovskite structure, A cations are surrounded by twelve anions in cubo-octahedral coordination, B cations are surrounded by six anions in octahedral coordination and oxygen anions are coordinated by two B cations and four A cations. In some embodiments, the $ABO_3$ perovskite structure is built from corner-sharing $BO_6$ octahedra. In some embodiments, the $ABO_3$ perovskite structure includes distorted derivatives. The distortions may be due to rotation or tilting of regular, rigid octahedra or due to the presence of distorted $BO_6$ octahedra. In some embodiments, the $ABO_3$ perovskite structure is cubic. In some embodiments, the $ABO_3$ perovskite structure is hexagonal.

In some embodiments, the perovskite material may be of formula $n(A_aB_bO_{3-\delta})$, in which n=1, 2, 3, 4, 8, and etc.

In some embodiments, A only comprises the first element. The first element may be a single element or a combination of elements selected from calcium (Ca), strontium (Sr), barium (Ba), lithium (Li), sodium (Na), potassium (K), and rubidium (Rb).

In some embodiments, A comprises a combination of the first element and the second element. The second element may be a single element or a combination of elements selected from yttrium (Y), bismuth (Bi), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Likewise, B may be a single element or a combination of elements selected from silver (Ag), gold (Au), cadmium (Cd), cerium (Ce), cobalt (Co), chromium (Cr), copper (Cu), dysprosium (Dy), erbium (Er), europium (Eu), ferrum (Fe), gallium (Ga), gadolinium (Gd), hafnium (Hf), holmium (Ho), indium (In), iridium (Ir), lanthanum (La), lutetium (Lu), manganese (Mn), molybdenum (Mo), niobium (Nb), neodymium (Nd), nickel (Ni), osmium (Os), palladium (Pd), promethium (Pm), praseodymium (Pr), platinum (Pt), rhenium (Re), rhodium (Rh), ruthenium (Ru), antimony (Sb), scandium (Sc), samarium (Sm), tin (Sn), tantalum (Ta), terbium (Tb), technetium (Tc), titanium (Ti), thulium (Tm), vanadium (V), tungsten (W), yttrium (Y), ytterbium (Yb), zinc (Zn), and zirconium (Zr).

In some embodiments, the perovskite material is of formula $SrCeO_3$, $SrZr_{0.3}Ce_{0.7}O_3$, $BaMnO_3$, $BaCeO_3$, $BaCe_{0.7}Zr_{0.3}O_3$, $BaCe_{0.5}Zr_{0.5}O_3$, $BaCe_{0.3}Zr_{0.7}O_3$, $BaCe_{0.5}Zr_{0.3}Y_{0.2}O_3$, $BaCe_{0.7}Zr_{0.1}Y_{0.2}O_3$, $BaZrO_3$, $BaCe_{0.9}Y_{0.1}O_3$, $BaCe_{0.85}Y_{0.15}O_3$, or $BaCe_{0.8}Y_{0.2}O_3$. For example, for $SrCeO_3$, A is Sr, a=1, B is Ce, b=1, and δ=0. For $SrZr_{0.3}Ce_{0.7}O_3$, A is Sr, a=1, B is a combination of Zr and Ce, b=1, and δ=0. For $BaMnO_3$, A is Ba, a=1, B is Mn, b=1, and δ=0. For $BaCeO_3$, A is Ba, a=1, B is Ce, b=1, and δ=0. For $BaZr_{0.3}Ce_{0.7}O_3$, A is Ba, a=1, B is a combination of Zr and Ce, b=1, and δ=0. For $BaZr_{0.3}Ce_{0.5}Y_{0.2}O_3$, A is Ba, a=1, B is a combination of Zr, Ce and Y, b=1, and δ=0.

In some embodiments, the perovskite material is of formula $La_{0.1}Ba_{0.9}Ce_{0.7}Zr_{0.2}Y_{0.1}O_3$, $Ce_{0.1}Ba_{0.9}Ce_{0.7}Zr_{0.2}Y_{0.1}O_{3.05}$, $Ce_{0.5}Ba_{0.5}Ce_{0.7}Zr_{0.2}Y_{0.1}O_{3.45}$, $Y_{0.1}Ba_{0.9}Ce_{0.7}Zr_{0.2}Y_{0.1}O_3$, $Y_{0.5}Ba_{0.5}Ce_{0.7}Zr_{0.2}Y_{0.1}O_{3.2}$, $Bi_{0.1}Ba_{0.9}Ce_{0.7}Zr_{0.2}Y_{0.1}O_3$, $Bi_{0.5}Ba_{0.5}Ce_{0.7}Zr_{0.2}Y_{0.1}O_{3.2}$, $Pr_{0.1}Ba_{0.9}Ce_{0.7}Zr_{0.2}Y_{0.1}O_3$, or $Pr_{0.5}Ba_{0.5}Ce_{0.7}Zr_{0.2}Y_{0.1}O_{3.2}$. For $La_{0.1}Ba_{0.9}Ce_{0.7}Zr_{0.2}Y_{0.1}O_3$, A is a combination of Ba and La, the first element is La, the second element is Ba, a=1, B is a combination of Ce, Zr and Y, b=1, and, δ=0. For $Ce_{0.1}Ba_{0.9}Ce_{0.7}Zr_{0.2}Y_{0.1}O_{3.05}$ and $Ce_{0.5}Ba_{0.5}Ce_{0.7}Zr_{0.2}Y_{0.1}O_{3.45}$, A is a combination of Ce and Ba, the first element is Ce, the second element is Ba, a=1, B is a combination of Ce, Zr and Y, b=1, and, δ=−0.05 and −0.45, respectively. For $Y_{0.1}Ba_{0.9}Ce_{0.7}Zr_{0.2}Y_{0.1}O_3$ and $Y_{0.5}Ba_{0.5}Ce_{0.7}Zr_{0.2}Y_{0.1}O_{3.2}$, A is a combination of Y and Ba, the first element is Y, the second element is Ba, a=1, B is a combination of Ce, Zr and Y, b=1, and, δ=0 and −0.2, respectively. For $Bi_{0.1}Ba_{0.9}Ce_{0.7}Zr_{0.2}Y_{0.1}O_3$ and $Bi_{0.5}Ba_{0.5}Ce_{0.7}Zr_{0.2}Y_{0.1}O_{3.2}$, A is a combination of Bi and Ba, the first element is Bi, the second element is Ba, a=1, B is a combination of Ce, Zr and Y, b=1, and, δ=0 and −0.2, respectively. Similarly, for $Pr_{0.1}Ba_{0.9}Ce_{0.7}Zr_{0.2}Y_{0.1}O_3$ and $Pr_{0.5}Ba_{0.5}Ce_{0.7}Zr_{0.2}Y_{0.1}O_{3.2}$, A is a combination of Pr and Ba, the first element is Pr, the second element is Ba, a=1, B is a combination of Ce, Zr and Y, b=1, and, δ=0 and −0.2, respectively.

In some embodiments, the treatment material is a combination of the perovskite material and ceria and is sintered together before contacting with the substrate. As used herein the term "sintering" or any variations thereof refers to, but is not limited to, a method for making objects by heating the material in a sintering furnace or other heater facility. In some embodiments, the sintering temperature is in a range from about 850° C. to about 1700° C. In some embodiments, the sintering temperature is at about 1000° C.

In some embodiments, the treatment material is contacted with the substrate after sintering. The surface layer may be formed in any conditions that can form the first and the second oxides while the treatment material is in contact with the substrate.

In some embodiments, the surface layer is formed in an environment comprising steam. In some embodiments, the environment comprises nitrogen. In some embodiments, the step of forming is at a temperature in a range of from about 600° C. to about 1400° C. or from about 850° C. to about 950° C.

Before the surface treatment, the substrate may be pretreated by washing, sanding, etc.

After the surface treatment, the treatment material is separated from the substrate and the substrate has the substrate layer and the surface layer on the substrate layer. The substrate layer may be the same or different before or after the surface treatment.

The surface layer may have different thicknesses based on needs and/or the formation environments. The surface layer is different from the substrate layer in compositions thereof, e.g., a metallic element exists in the surface layer in the form of an oxide but not in the form of an oxide in the substrate layer and the substrate layer includes little or no elements from the treatment material. In some embodiments, it may be possible to distinguish between the surface layer and the substrate layer. In some embodiments, a gradient may exist in which it becomes difficult to observe a boundary between the substrate layer and the surface layer.

As can be seen from following examples, the surface layer formed in the surface treatment is anticoking.

EXAMPLES

The following examples are included to provide additional guidance to those of ordinary skill in the art in practicing the embodiments of the claimed invention. These examples do not limit the embodiments of the present invention as defined in the appended claims.

Example 1 $BaCe_{0.7}Zr_{0.3}O_3$ Powder Preparation

The $BaCe_{0.7}Zr_{0.3}O_3$ powder was prepared by solid-state reaction method. Stoichiometric amounts of high-purity barium carbonate, zirconium oxide, and cerium oxide powders (all from sinopharm chemical reagent Co., Ltd. (SCRC), Shanghai, China) were mixed in ethanol and ball-milled for 16 hours. The resultant mixtures were then dried and calcined at 1600° C. in air for 2 hours to form the $BaCe_{0.7}Zr_{0.3}O_3$ powder. The calcined powder was mixed with alcohol and was ball milled for 16 hours. After the alcohol was dried, the fine $BaCe_{0.7}Zr_{0.3}O_3$ powder ($d_{50}$=1.5 micron) was prepared.

Example 2 Treatment Material Preparation $BaZr_{0.3}Ce_{0.7}O_3$ powder (7.87 g) prepared in example 1 and 11.93 g of $CeO_2$ sol (20 wt % in $H_2O$, Alfa Aesar #12730, from Alfa Aesar Company, Ward Hill, Mass., USA) were added into a plastic jar mounted on speed mixer machines. After mixing for 30 minutes, the mixture was dried using an infra red lamp. The dried powders were pressed into treatment sheets.

The treatment sheets were put into a tube furnace for sintering at 1000° C. in vacuum before being cooled to the room temperature. The increasing and decreasing rates of temperature in the furnace were 5° C./min.

Example 3 Surface Treatment

The treatment sheets obtained in example 2 were smoothed using a sand paper and separated from the powders on the surface using the compressed air.

A plurality of substrates made of a Kubota KHR45A alloy were cut after the preliminary treatment using a sandblasting machine and were polished using sand papers. The polished substrates were washed in the deionized water using the ultra sound for 10 minutes before wiping by paper and drying by the compressed air.

The treatment sheets were then placed on the substrates to cover a part of a surface of each substrate. The substrates and the treatment sheets were put into a tube furnace and treated for 8 hours at 850° C. in an atmosphere of nitrogen and steam ($N_2$:$H_2O$=1:1, weight ratio). The energy dispersive X-Ray spectroscopy (EDX) analysis results shown in tables 2 and 3 below reveals oxides of the elements from both the substrate and the treatment sheet were formed on the surfaces of the substrates contacted with the treatment sheets, while oxides of only the elements from the substrates were formed on the surfaces of the substrates not contacted with the treatment sheets.

TABLE 2 after treatment EDX results of the surface of the
substrate contacted with the treatment sheet

| spectrum | O (wt %) | Si (wt %) | Cr (wt %) | Mn (wt %) | Fe (wt %) | Ni (wt %) | Zr (wt %) | Ba (wt %) | Ce (wt %) | Total (wt %) |
|---|---|---|---|---|---|---|---|---|---|---|
| Spectrum 1 | 24.6 | 1.7 | 22.6 | 1.6 | 6.7 | 14 | 1.6 | 16 | 11 | 100 |
| Spectrum 2 | 28 | 2.7 | 28.7 | 1.6 | 10 | 20 | | 8.9 | | 100 |
| Spectrum 3 | 25.4 | 4.1 | 25.2 | 1.2 | 10.8 | 24 | | 9.6 | | 100 |

TABLE 3 after treatment EDX results of the surface of the
substrate not contacted with the treatment sheet

| Spectrum | O (wt %) | Si (wt %) | Cr (wt %) | Mn (wt %) | Fe (wt %) | Ni (wt %) | Total (wt %) |
|---|---|---|---|---|---|---|---|
| Spectrum 1 | 25.9 | 2.6 | 27.9 | 1.5 | 12.7 | 29 | 100 |
| Spectrum 2 | 30.6 | 0.8 | 52.2 | 2.8 | 5.1 | 8.4 | 100 |
| Spectrum 3 | 28.9 | 0.8 | 55.5 | 2.1 | 5.1 | 7.5 | 100 |
| Spectrum 4 | 31.3 | 2.4 | 30.7 | 1.3 | 10.9 | 24 | 100 |

The EDX results (tables 4 and 5 below) of the cross section of the substrate confirmed that the surface layer comprises oxides of elements from both the substrate and the treatment sheet and no pure metal as the amount of oxygen element therein is high, while the substrate layer does not include oxygen element.

TABLE 4 after treatment EDX result of the surface layer of the substrate

| Element | Weight % | Atomic % |
|---|---|---|
| O | 34.41 | 62.3 |
| Al | 2.73 | 2.93 |
| Si | 4.65 | 4.79 |
| P | 0.58 | 0.54 |
| Cr | 30.53 | 17.01 |
| Mn | 2.56 | 1.35 |
| Fe | 3.18 | 1.65 |
| Ni | 17.45 | 8.61 |
| Ba | 3.91 | 0.82 |
| Total | 100 | |

TABLE 5 after treatment EDX result of the substrate layer

| Element | Weight % | Atomic % |
|---|---|---|
| Si | 2.50 | 4.87 |
| Cr | 29.82 | 31.30 |
| Fe | 19.81 | 19.35 |
| Ni | 47.87 | 44.49 |
| Total | 100.00 | |

Example 4 Hydrocarbon Cracking

The treated substrates were exposed in a heptane cracking environment (weight ratio of steam:heptane=1:1; 850° C.). EDX results shown in tables 6 and 7 below reveal coke deposition was significantly reduced on the surface layers of the substrates formed in the surface treatment with respect to the surfaces of the substrates not contacted with treatment sheets in the surface treatment.

TABLE 6 after cracking EDX results of the surface layer
of the substrate formed in the surface treatment

| | Spectrum 1 | | Spectrum 2 | | Spectrum 3 | |
|---|---|---|---|---|---|---|
| Element | Weight % | Atomic % | Weight % | Atomic % | Weight % | Atomic % |
| C | 3.46 | 8.69 | 4.91 | 12.37 | 3.78 | 9.82 |
| O | 28.40 | 53.59 | 25.94 | 49.09 | 25.47 | 49.70 |
| Si | 2.83 | 3.04 | 3.16 | 3.40 | 2.96 | 3.29 |
| Cr | 30.26 | 17.57 | 29.54 | 17.20 | 26.21 | 15.74 |
| Mn | 1.78 | 0.98 | 2.13 | 1.17 | 2.06 | 1.17 |
| Fe | 9.35 | 5.05 | 9.24 | 5.01 | 11.14 | 6.23 |
| Ni | 19.77 | 10.16 | 21.08 | 10.87 | 24.96 | 13.27 |
| Ba | 4.15 | 0.91 | 3.99 | 0.88 | 3.42 | 0.78 |
| Total | 100.00 | | 100.00 | | 100.00 | |

TABLE 7 after cracking EDX results of the surface of the
substrate not treated with the treatment sheet

| Element | Weight % | Atomic % |
|---|---|---|
| C | 95.90 | 98.33 |
| O | 1.35 | 1.04 |
| Cr | 1.87 | 0.44 |
| Fe | 0.34 | 0.07 |
| Ni | 0.54 | 0.11 |
| Total | 100.00 | |

Example 5

The powders of barium carbonate were pressed into treatment sheets and placed on substrates. The substrates and the treatment sheets were put into a tube furnace and treated for 8 hours at 850° C. in an atmosphere of nitrogen and steam ($N_2:H_2O=1:1$, weight ratio). After treatment, the substrates were exposed in a heptane cracking environment (weight ratio of steam:heptane=1:1; 850° C.). No coke was observed on any of the treated surfaces of the substrates.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A surface treatment method, the method comprising:
contacting a substrate with a treatment material, the substrate comprising a metallic element, the treatment material comprising an alkaline earth metal element, an alkali metal element, or any combination thereof; and
forming on the substrate a surface layer comprising a first oxide of the alkaline earth metal element or the alkali metal element, and a second oxide of the metallic element, wherein the treatment material comprises a perovskite material, ceria or barium carbonate, wherein the treatment material is sintered before contacting the substrate, wherein the step of forming is at a temperature in a range from 600° C. to 1400° C. in the presence of nitrogen and steam, and comprising the step of:
separating the treatment material from the substrate after the step of forming, wherein the treatment material is separated from the substrate, the substrate having a substrate layer, and the surface layer is present on the substrate layer.

2. The surface treatment method of claim 1, wherein the substrate comprises an alloy.

3. The surface treatment method of claim 1, wherein the perovskite material is of formula $A_aB_bO_3-\delta$, wherein $0.9 < a \leq 1.2$;

$0.9 < b \leq 1.2$;

$0.5 < \delta < 0.5$;

A comprises a first element and optionally a second element, the first element is selected from calcium (Ca), strontium (Sr), barium (Ba), lithium (Li), sodium (Na), potassium (K), rubidium (Rb) and any combination thereof, the second element is selected from yttrium (Y), bismuth (Bi), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and any combination thereof; and B is selected from silver (Ag), gold (Au), cadmium (Cd), cerium (Ce), cobalt (Co), chromium (Cr), copper (Cu), dysprosium (Dy), erbium (Er), europium (Eu), ferrum (Fe), gallium (Ga), gadolinium (Gd), hafnium (Hf), holmium (Ho), indium (In), iridium (Ir), lanthanum (La), lutetium (Lu), manganese (Mn), molybdenum (Mo), niobium (Nb), neodymium (Nd), nickel (Ni), osmium (Os), palladium (Pd), promethium (Pm), praseodymium (Pr), platinum (Pt), rhenium (Re), rhodium (Rh), ruthenium (Ru), antimony (Sb), scandium (Sc), samarium (Sm), tin (Sn), tantalum (Ta), terbium (Tb), technetium (Tc), titanium (Ti), thulium (Tm), vanadium (V), tungsten (W), yttrium (Y), ytterbium (Yb), zinc (Zn), zirconium (Zr), and any combination thereof.

4. The surface treatment method of claim 1, wherein the perovskite material comprises $BaCe0.7Zr0.3O3$.

5. The surface treatment method of claim 1, wherein the surface layer is different from the substrate layer in compositions thereof.

6. The surface treatment method of claim 1, wherein a gradient exists between the surface layer and the substrate layer.

* * * * *